Patented Dec. 17, 1940

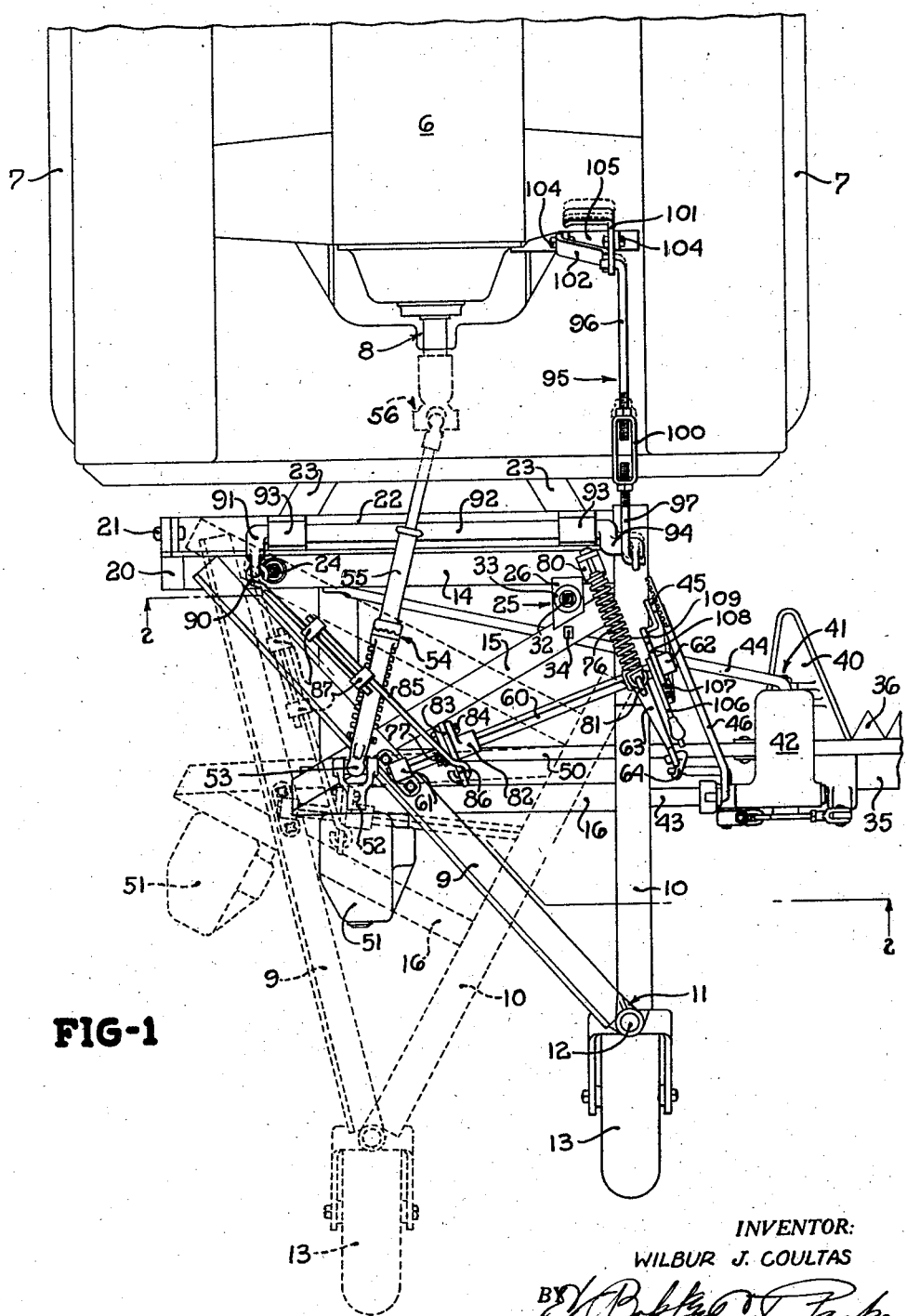

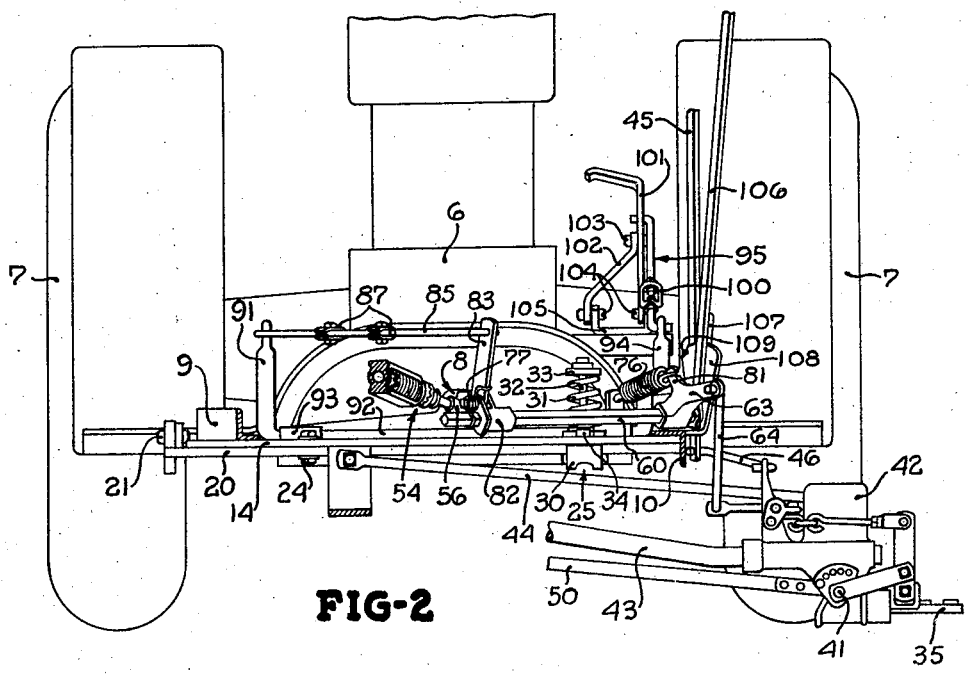

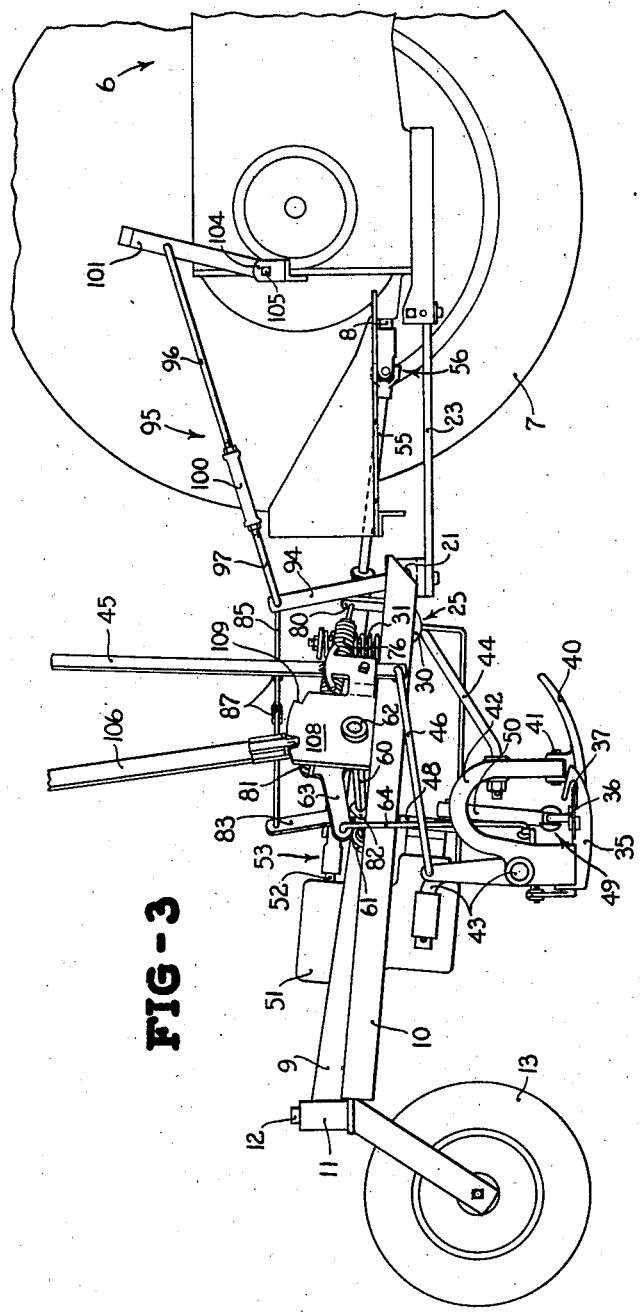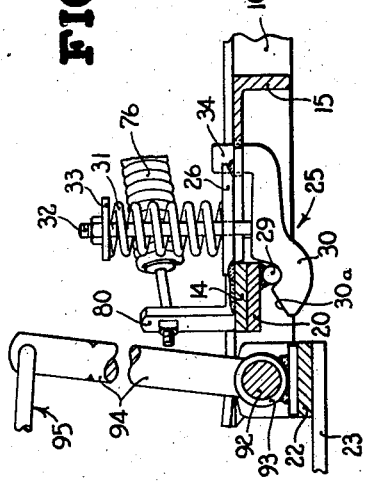

2,225,156

UNITED STATES PATENT OFFICE 2,225,156

MOWER

Wilbur J. Coultas, Moline, Ill., assignor to Deere & Company, Moline, Ill., a corporation of Illinois Application May 31, 1939, Serial No. 276,635

18 Claims. (Cl. 56—25)

This invention relates to tractor drawn mowers, and more particularly to mowers of the type in which the cutting mechanism is held in laterally extending operative position by releasable latch means, and is swingable about a vertical pivot to a rearwardly trailing position upon striking an obstruction. The principal object of the present invention is to provide an improved lifting connection between the tractor and mower whereby the cutter bar may be raised by operating a lever mounted on the tractor.

More specifically, the object of the present invention is to provide a lifting connection in which the tractor mounted control lever is not appreciably affected by the rearward swinging of the mower cutter bar when the latter is released.

Other objects and advantages of the present invention will be apparent from the following detailed description of an illustrative embodiment, taken in conjunction with the accompanying drawings illustrating such embodiment.

In the drawings:

Figure 1 is a fragmentary top plan view of a tractor drawn mower illustrating my improved lifting connection for raising the cutter bar;

Figure 2 is a sectional view taken substantially along the line 2—2 of Figure 1;

Figure 3 is a side view of the mower; and

Figure 4 is a view of the latch mechanism releasably holding the mower in operating position.

Referring now to the drawings, the mower is mounted on a tractor having a body 6, rear driving wheels 7, and a rearwardly extending, engine driven power take-off shaft 8.

The mower frame comprises a pair of angle iron members 9 and 10 which are suitably spaced apart at their forward ends and converge rearwardly, their rear ends being fixed to a caster wheel support member 11 which receives the vertical spindle 12 of a caster wheel 13. The frame members 9 and 10 are connected together by means of a forward transverse bar 14, a diagonal brace bar 15, and a rear transverse bar 16, forming a rigid mower frame adapted to carry the cutter bar and associated mechanism.

The forward end of the mower frame is supported, as hereinafter described, on a transversely extending member 20 which is disposed beneath and parallel to the transverse bar 14. The transverse member 20 is pivotally connected at 21 with a second transverse member 22 for relative vertical swinging movement, and the member 22 is rigidly connected with the tractor body 6 by means of forwardly extending members 23. A vertically disposed pivot bolt 24 is passed through aligned holes in transverse members 14 and 20 adjacent the left ends thereof, and provides for horizontal swinging of the mower frame relative to the supporting member.

At its opposite side, the frame of the mower is releasably connected with the supporting member through the instrumentality of a latch mechanism 25. This latch mechanism 25 comprises a cross piece 26 extending between and fixed to frame members 14 and 15, and a latch member 30 disposed beneath the cross piece 26 and adapted to engage a complementary latch member fixed to the under side of transverse member 20. The latch member 30 is yieldingly supported by means of a spring 31 disposed on top of cross piece 26 and embracing a bolt 32 which extends vertically through a suitable opening in the cross piece, the upper end of the spring bearing against a retaining washer 33 carried by the bolt and the lower end of the spring bearing against the cross piece 26. The latch member 30 is provided with a vertically extending lug 34 at its rear end which projects upwardly through a suitable slot in the frame member 15 and, together with the bolt 32, maintains the latch member 30 in proper position. The forward end of the latch member 30 is provided with the usual cam surface 30a to facilitate engagement with the complementary latch member on the supporting member 20.

Should the cutter bar of the mower strike an obstruction when in operation whereby said cutter bar is prevented from moving forward with the tractor, the latch device 25 is released, whereupon the mower will swing rearwardly about the vertical pivot bolt 24, as will be readily understood.

The cutter bar, indicated at 35, supports a reciprocating sickle 36, and is supported, in turn, on a shoe 40, which is pivotally connected by a fore and aft extending pivot pin 41 to a shoe arch 42 for vertical swinging relative thereto. The shoe arch 42 is connected with the mower frame by a drag bar 43 and a rod or brace 44. The shoe arch 42 is journaled for rocking movement about a transverse axis on the drag bar 43 and such rocking movement is controlled by a tilting lever 45 with which the shoe arch is connected by a link 46. The cutter bar 35 is raised relative to the mower frame through the agency of lifting connections to be described in detail presently.

The sickle 36 is slidably supported on the cutter bar 35 for reciprocatory movement and is operated by a pitman 50 with which it is pivotally connected at one end. The other end of the pitman 50 is journaled on a crank shaft (not shown), which is journaled in and extends forwardly from a drive housing 51. The drive housing 51 is mounted on frame members 15 and 16 and encloses suitable power transmitting means, including a forwardly extending driving shaft 52, for rotating the above-mentioned crank shaft and thereby driving the pitman 50. The driving shaft 52 is driven from the power take-off shaft 8 on the tractor through suitable connection therewith including a universal joint 53, slip clutch 54, telescoping shaft 55, and second universal joint 56.

As my present invention is not particularly concerned with the construction of the mower frame, mower cutting mechanism, or with the means for driving the cutting mechanism from the power take-off shaft of the tractor, it is believed that the above brief description thereof will suffice, and any conventional construction embodying the general features herein outlined might be used as for example that shown and described in Patent 1,946,541, issued February 13, 1934.

As mentioned above, the cutter bar 35 is raised and lowered relative to the mower frame through the agency of a lifting connection, said connection including a generally transversely extending rock shaft 60, preferably of square cross section, having cylindrical portions on its ends journaled in bearings 61 and 62 mounted on the frame members 9 and 10, respectively. Fixed to the rock shaft 60 adjacent the shoe arch 42 is a rearwardly extending lifting arm 63, said arm being in the form of a casting having a square aperture formed therein adapted to receive the square rock shaft. Connected to the rear end of the arm 63 and extending downwardly therefrom is a link 64, the lower end of which is connected with the cutter bar 35. When the rock shaft 60 is rocked so as to raise the arm 63, the cutter bar 35 is swung upwardly about the pivot 41. A counterbalancing spring 76 is anchored to a bracket 80 fixed on the frame member 14 and engages an upwardly projecting lug 81 on the arm 63, exerting a lifting effect on the latter tending to counterbalance a portion of the weight of the cutter bar 35.

Mounted on the other end of the rock shaft 60 is a jointed lever arm comprising a hub casting 82 having a square aperture which receives the square rock shaft, and an upwardly extending arm 83 pivotally connected to the hub casting by a pivot bolt 84. The hub casting 82 is provided with a suitable stop which engages the arm 83 and limits the forward swinging of the same relative to the hub, and a spring 77 that yieldingly urges the arm 83 back against the stop. Thus, when the arm 83 is pulled forwardly, it engages the stop on the hub casting 82, and further movement of the arm rocks the hub and rock shaft, thereby raising the arm 63 and lifting the cutter bar 35. This jointed lever arm 82, 83 provides a lost motion connection in the lifting connections allowing the cutter bar to rise and fall to a limited extent as it follows the contour of the ground without transmitting such motion to the operating pedal on the tractor.

An adjustable connecting rod 85, preferably although not necessarily made up of two overlapping parallel members connected together by a pair of spaced clamps 87, has a hook 86 at one end thereof engaging an eye in the arm 83. The other end of the connecting rod 85 is likewise provided with a hook 90, which is passed through an eye in a lever arm 91 comprising an integral part of a transverse rock shaft 92. The rock shaft 92 is preferably in the form of a bail which is journaled in a pair of spaced bearings 93 mounted on the transverse supporting frame member 22 and has its left end portion bent upright to form the lever arm 91. As shown, the lever arm 91 is disposed in close proximity to the vertical pivot bolt 24 about which the mower frame swings when the latch 25 has been released, and extends slightly rearwardly so that the flexible joint in the lifting connections is substantially coincident with the axis of the pivot bolt connecting the mower frame with the stationary supporting frame. The purpose of this is to minimize or eliminate the tendency of the rock shaft to rock when the mower frame and lifting connections carried thereby swing rearwardly.

The right end portion of the rock shaft 92 is bent upwardly to form a lever arm 94 and is provided with an aperture which receives the laterally outwardly extending rear end of a connecting link 95. The link 95 preferably consists of two rod members 96 and 97 having their adjacent ends threaded and a turnbuckle 100 connecting the same, whereby the link can be lengthened or shortened to accommodate it to various makes of tractor. The front end of the link 95 is bent laterally inward and engages an aperture in a foot pedal 101 that is pivotally supported on the tractor body within convenient reach of the operator's right foot. A bracing member 102 is bolted to the foot pedal at 103 and diverges downwardly therefrom to brace the foot pedal 101 laterally, both the foot pedal and bracing member being pivotally connected at their lower ends by aligned transverse pivot bolts 104 to a bracket member 105 fixed in any suitable manner to the tractor body 6.

An auxiliary lifting connection is also provided for raising the cutter bar by hand and locking the same in raised position, said auxiliary lifting connection comprising an upwardly extending hand lever 106 fixedly mounted on the rock shaft 60 adjacent the lifting lever 63 and having a releasable latch 107 engageable with a sector 108 fixed to the mower frame. The sector 108 is provided with a notch 109 at the front edge thereof and the latch 107 is adapted to catch on this notch when the cutter bar has been raised to transport position, locking the lifting connections in raised position.

The operation of my invention is as follows: The mower frame is normally held by the latch 25 in the position shown in solid lines in Figure 1. Should the cutter bar strike an obstruction, the latch 25 releases the frame and allows it to swing rearwardly to the position indicated in dotted lines. It will be observed, however, that the movement of the rock shaft 92 and foot lever 101 resulting from this rearward swinging of the mower frame is negligible, and it will be appreciated that such movement of the foot lever can be eliminated altogether by positioning the upper end of the rock shaft arm 91 so that it lies directly in an extension of the axis of pivot bolt 24, instead of slightly to one side thereof as illustrated in the drawings.

To raise the cutter bar 35, the operator pushes forwardly and downwardly on the foot pedal 101, rocking the rock shaft 92 and causing the connecting rod 85 to move forwardly. Forward movement of the connecting rod 85 rocks the rock shaft 60, raising the arm 63 which, in turn, rocks the bell crank 65 to raise the cutter bar 35. The hand lever 106 can be used to assist the foot pedal 101, especially when it is desired to raise the cutter bar to a considerable height or to raise it to transport position, and in the latter case, the lever is pulled forwardly until the latch 107 engages the notch 109 in the sector 108.

What I claim as my invention and desire to secure by Letters Patent is:

1. In combination, a vehicle, a member connected therewith for vertical swinging about a transverse axis, a wheel supported implement connected with said member for swinging movement about a vertical axis, a releasable latch for holding said implement in fixed operative position with respect to said member, operating mechanism connected with said implement for swinging movement relative thereto, and means for swinging said operating mechanism including link means carried on said implement and movable therewith, second link means carried on said vehicle, and means disposed closely adjacent said vertical axis for swingably connecting said link means together.

2. In combination, a vehicle, an implement comprising a supporting member connected to said vehicle for relative vertical movement and a main frame mounted on said supporting member for swinging movement about a vertical axis, operating mechanism connected with said main frame for relative vertical movement, lifting mechanism carried on said main frame and connected with said operating mechanism for raising the same, and means for actuating said lifting mechanism comprising link means operatively connected with said lifting mechanism, and other link means mounted on said vehicle, both of said link means being swingably connected together at a point closely adjacent said vertical axis.

3. In a mower having a frame adapted to be connected with a tractor for relative swinging movement about a vertical axis, releasable latch means for normally holding said mower frame against swinging movement, a laterally extending cutter bar connected with said frame for vertical swinging movement, lifting mechanism mounted on said mower frame and connected with said cutter bar for raising the same, actuating mechanism carried on said tractor, and link means connecting said actuating mechanism with said lifting mechanism including lost motion connections whereby said cutter bar is allowed to rise and fall to a limited extent without transmitting motion to said actuating mechanism, said link means being connected to said actuating mechanism at a point substantially coincident with said vertical axis.

4. In a mower having a frame adapted to be connected with a tractor for relative swinging movement about a vertical axis, releasable latch means for normally holding said mower frame against swinging movement, a laterally extending cutter bar connected with said frame for vertical swinging movement, a rock shaft journaled on said mower frame, means connecting said rock shaft with said cutter bar whereby the latter is raised when the rock shaft is rocked, actuating mechanism carried on said tractor, and lost motion means connecting said rock shaft with said actuating mechanism whereby said cutter bar is allowed to rise and fall to a limited extent without transmitting motion to said actuating mechanism, said lost motion means being connected with said actuating mechanism at a point closely adjacent said vertical axis whereby a negligible amount of motion is transmitted to the actuating mechanism when said mower frame is released and allowed to swing about said vertical axis.

5. In a mower having a frame adapted to be connected with a tractor for relative swinging movement about a vertical axis, releasable latch means for normally holding said mower frame against swinging movement, a laterally extending cutter bar connected with said frame for vertically swinging movement, a rock shaft journaled on said mower frame, means connecting said rock shaft with said cutter bar whereby the latter is raised when the rock shaft is rocked, actuating mechanism carried on said tractor, a jointed lever arm connected with said rock shaft and having lost motion whereby the cutter bar is allowed to rise and fall to a limited extent without transmitting motion to said actuating mechanism, and link means connecting said lever arm with said actuating mechanism, said link means being disposed in close proximity with said vertical axis whereby a negligible amount of motion is transmitted to the actuating mechanism when said mower frame is released and allowed to swing about said vertical axis.

6. In a mower having a frame adapted to be connected with a tractor for relative swinging movement about a vertical axis, releasable latch means for normally holding said mower frame against swinging movement, a laterally extending cutter bar connected with said frame for vertical swinging movement, lifting mechanism mounted on said mower frame and connected with said cutter bar for raising the same, actuating mechanism carried on said tractor, link means connecting said actuating mechanism with said lifting mechanism including a flexible joint connection disposed closely adjacent said vertical axis, and auxiliary actuating mechanism carried on said mower frame and connected with said lifting mechanism.

7. In a mower having a frame adapted to be connected with a tractor for relative swinging movement about a vertical axis, releasable latch means for normally holding said mower frame against swinging movement, a laterally extending cutter bar connected with said frame for vertical swinging movement, a rock shaft journaled on said mower frame, means connecting said rock shaft with said cutter bar whereby the latter is raised when the rock shaft is rocked, a foot pedal pivotally connected with said tractor, means connecting said foot pedal with said rock shaft including flexible means disposed adjacent said vertical axis, and an auxiliary hand lever fixed on said rock shaft, and having latch means adapted to lock said rock shaft whereby said cutter bar is held in raised position.

8. In a mower having a frame adapted to be connected with a tractor for relative swinging movement about a vertical axis, releasable latch means for normally holding said mower frame against swinging movement, a laterally extending cutter bar connected with said frame for vertical swinging movement, a rock shaft journaled on said mower frame, means connecting said rock shaft with said cutter bar whereby the latter is raised when the rock shaft is rocked, a second rock shaft carried on said tractor, an arm on said second rock shaft disposed with its free end adjacent said vertical axis, link means connecting said arm with said first mentioned rock shaft, and means on said tractor for rocking said second rock shaft.

9. In a tractor drawn mower, a supporting member adapted to be pivotally connected with a tractor for swinging about a transverse axis, a wheel supported mower frame connected with said supporting member for relative swinging movement about a vertical axis, latch means normally holding said mower frame in fixed position with respect to said supporting member and releasable under excessive load to allow the mower frame to swing rearwardly, a laterally extending cutter bar connected with said mower frame for vertical swinging movement, a rock shaft journaled on said mower frame, link means connecting said rock shaft with said cutter bar whereby the latter is raised when the rock shaft is rocked, a second rock shaft carried on said tractor and disposed substantially coaxial with said transverse axis, link means connecting said second rock shaft with said first named rock shaft including a flexible joint connection disposed closely adjacent said vertical axis, and means on said tractor for rocking said second rock shaft.

10. The combination with a tractor and a supporting member adapted to be fixedly mounted thereon, of a mower frame connected with said supporting member for swinging movement about a vertical axis, a cutter bar connected with said mower frame for vertical movement relative thereto, lifting mechanism carried on said mower frame and swingable therewith, said lifting mechanism being connected with said cutter bar for raising the same, a rock shaft journaled on said supporting member and having a pair of spaced lever arms, one of said lever arms being disposed with its free end in close proximity with said vertical axis, link means operatively connecting said one lever arm with said lifting mechanism, an actuating member pivotally connected with said tractor, and link means connecting the other of said lever arms with said actuating member 11. The combination with a tractor and a supporting member adapted to be fixedly mounted on the rear end thereof, of a mower frame connected with said supporting member for swinging movement about a vertical axis, a cutter bar connected with said mower frame for vertical movement relative thereto, lifting mechanism carried on said mower frame and swingable therewith, said lifting mechanism being connected with said cutter bar for raising the same, a transversely disposed bail journaled on said supporting member and having a pair of lever arms at opposite ends thereof, one of said lever arms having its free end adjacent said vertical axis, means operatively connecting said one lever arm with said lifting mechanism, a foot pedal pivotally connected with said tractor ahead of said other lever arm, and means connecting the other of said lever arms with said foot pedal.

12. A mower adapted for mounting on a tractor, comprising in combination a transverse supporting member fixedly mounted on the rear end of said tractor, a mower frame pivotally connected to said supporting member near one end thereof for rearward swinging movement about a vertical axis, a cutter bar connected with said mower frame for vertical swinging, lifting mechanism on said mower frame connected with said cutter bar for raising the same, a transverse rock shaft journaled on said supporting member, upwardly extending lever arms fixed on opposite ends of said rock shaft, one of said lever arms having its free end disposed in close proximity with said vertical axis and the other of said lever arms being disposed adjacent the other end of said supporting member, link means connecting the free end of said first named lever arm with said lifting mechanism, an actuating member pivoted on said tractor, and link means connecting said other lever arm with said actuating member.

13. For use with a mower comprising a mower frame adapted to be pivotally connected with a tractor for swinging movement about a vertical axis disposed to one side of the center line of the tractor, a cutter bar connected with said mower frame for vertical swinging movement, and a lifting arm journaled on said mower frame and connected with said cutter bar for raising the same, a transverse rock shaft rotatably supported on said tractor, a lever arm fixed to said rock shaft adjacent said vertical axis, means operatively connecting said lever arm with said lifting arm, a second lever arm fixed to said rock shaft on the other side of the center line of said tractor, an actuating pedal pivotally connected with said tractor ahead of said second lever arm, and link means connecting said second lever arm with said actuating pedal.

14. In a tractor drawn mower comprising a mower frame having a laterally extending cutter bar connected therewith for vertical swinging movement, means connecting said mower frame to a tractor for relative swinging movement about a vertical axis disposed to the left of the center line of the tractor, and a lifting arm journaled on said mower frame and connected with said cutter bar for raising the same, a transverse rock shaft supported on said tractor and having a pair of upwardly extending lever arms on opposite ends thereof, one of said lever arms being disposed closely adjacent said vertical axis and the other lever arm being disposed to the right of the center line of the tractor, link means operatively connecting said first mentioned lever arm with said lifting arm, an actuating member swingably connected with said tractor on the right side thereof, and link means connecting said actuating member with said other lever arm.

15. For use with a tractor drawn mower including a transversely extending member adapted to be rigidly connected with a tractor at the rear end thereof, a second transverse member pivotally connected to said first mentioned member for vertical swinging movement relative thereto, a mower frame connected with said second transverse member near one end thereof for swinging movement about a vertical axis, latch means connecting said mower frame to said second transverse member near the other end thereof and releasable under excessive load to allow the mower frame to swing rearwardly, a cutter bar connected with said mower frame for vertical movement relative thereto, and a lifting arm journaled on said mower frame and connected with said cutter bar for raising the same, the combination of a rock shaft journaled on said first mentioned transversely extending member and having lever arms fixed to each end thereof, one of said lever arms having its free end disposed in close proximity with said vertical axis and the other lever arm being disposed at the other end of the said first mentioned transverse member, link means connecting said first mentioned lever arm with said lifting arm, a foot pedal pivotally mounted on said tractor on the side corresponding with said other lever arm, and means operatively connecting said foot pedal with said other lever arm.

16. In a mower having a frame adapted to be connected with a tractor for relative swinging movement about a vertical axis, releasable latch means for normally holding said mower frame against swinging movement, a laterally extending cutter bar connected with said frame for vertical swinging movement, a rock shaft journaled on said mower frame, means connecting said rock shaft with said cutter bar whereby the latter is raised when the rock shaft is rocked, a second rock shaft carried on said tractor, an arm on each of said rock shafts, the free end of one of said arms being disposed adjacent said vertical axis, link means connecting said arms, means on said tractor for rocking said second rock shaft.

17. In a mower having a frame adapted to be connected with a tractor for relative swinging movement about a vertical axis, releasable latch means for normally holding said mower frame against swinging movement, a laterally extending cutter bar connected with said frame for vertical swinging movement, a rock shaft journaled on said mower frame, means connecting said rock shaft with said cutter bar whereby the latter is raised when the rock shaft is rocked, means on said tractor for exerting a lifting force upon said rock shaft, and means connecting the latter means to said rock shaft including a flexible joint connection disposed closely adjacent said vertical axis.

18. In a mower having a frame adapted to be connected with a tractor for relative swinging movement about a vertical axis, releasable latch means for normally holding said mower frame against swinging movement, a laterally extending cutter bar connected with said frame for vertical swinging movement, a lifting member journaled on said mower frame, means connecting said lifting member with said cutter bar whereby the latter is raised when said lifting member is actuated, means on the tractor for exerting a lifting force upon said lifting member, and means connecting the latter means to said lifting member including a flexible joint connection disposed closely adjacent said vertical axis.

WILBUR J. COULTAS.